United States Patent [19]
Weinstein et al.

[11] Patent Number: 6,143,339
[45] Date of Patent: *Nov. 7, 2000

[54] METHOD FOR MAKING A COMPLEXLY PATTERNED EXTRUDATE

[75] Inventors: James N. Weinstein, Minneapolis; Scott A. Tolson, Arden Hills, both of Minn.

[73] Assignee: General Mills, Inc., Minneapolis, Minn.

[*] Notice: This patent is subject to a terminal disclaimer.

[21] Appl. No.: 09/360,830

[22] Filed: Jul. 26, 1999

Related U.S. Application Data

[62] Division of application No. 09/072,868, May 5, 1998, which is a division of application No. 08/241,321, May 11, 1994, Pat. No. 5,639,485.

[51] Int. Cl.⁷ .................................................... A23L 1/27
[52] U.S. Cl. ...................... 426/249; 426/497; 426/446; 426/391; 426/496; 426/512; 426/516; 426/518; 426/549; 426/559
[58] Field of Search .................................... 426/516, 249, 426/497, 446, 391, 496, 512, 518, 549, 559, 503; 264/173.116, 173.18; 425/131.1, 133.1, 461, 462

[56] References Cited

U.S. PATENT DOCUMENTS

| | | | |
|---|---|---|---|
| 1,719,369 | 4/1929 | Martin | 426/104 |
| 2,774,314 | 12/1956 | Moser | 426/249 |
| 2,858,217 | 10/1958 | Benson | 426/93 |
| 2,858,219 | 10/1958 | Benson | 426/93 |
| 2,874,649 | 2/1959 | Pelletier | 426/249 |
| 3,014,437 | 12/1961 | Dutchess | 425/131.1 X |
| 3,314,381 | 4/1967 | Fries et al. | 425/131.1 |
| 3,447,931 | 6/1969 | Benson et al. | 426/249 |
| 3,461,822 | 8/1969 | Rikert et al. | 107/54 |
| 3,499,766 | 3/1970 | Vollink et al. | 426/250 |
| 3,551,165 | 12/1970 | Reesman et al. | 99/81 |
| 3,690,896 | 9/1972 | Maxwell | 99/81 |
| 3,779,676 | 12/1973 | Bernard | 425/131.1 |
| 4,459,094 | 7/1984 | Sanabria | 425/131.1 |
| 4,504,511 | 3/1985 | Binley | 426/249 X |
| 4,542,686 | 9/1985 | Bansal | 425/131.1 X |
| 4,614,489 | 9/1986 | Juravic | 425/376.1 |
| 4,626,187 | 12/1986 | Kamada | 425/131.1 |
| 4,695,236 | 9/1987 | Predohl et al. | 425/382.4 |
| 4,698,004 | 10/1987 | Ramnarine | 425/131.1 |
| 4,786,243 | 11/1988 | Kehoe | 425/131.1 |
| 5,019,404 | 5/1991 | Meisner | 426/249 |
| 5,066,435 | 11/1991 | Lorenz et al. | 425/382.4 |
| 5,114,724 | 5/1992 | Bottero | 426/249 |
| 5,165,949 | 11/1992 | Farnsworth et al. | 426/496 |
| 5,486,049 | 1/1996 | Boatman et al. | 366/175.2 |
| 5,620,713 | 4/1997 | Rasmussen | 425/131.1 |
| 5,626,892 | 5/1997 | Kehoe et al. | 426/3 |
| 5,639,485 | 6/1997 | Weinstein | 425/131.1 |
| 5,827,557 | 10/1998 | Weinstein et al. | 426/249 |
| 5,843,503 | 12/1998 | Clanton et al. | 426/249 |

FOREIGN PATENT DOCUMENTS

| | | | |
|---|---|---|---|
| 2167536 | 8/1973 | Germany | 426/249 |

*Primary Examiner*—Cynthia L. Nessler
*Attorney, Agent, or Firm*—John A. O'Toole; Douglas J. Taylor; Everett G. Diederiks, Jr.

[57] ABSTRACT

Disclosed are apparatus (10) for making a complexly patterned extrudate. The apparatus (10) includes a food cooker extruder (12) for providing at least one extrudable food product, at least one food color supply (18), a pattern forming die (20) for mixing the food color and extrudate food product to form a complexly patterned food product, a reducing passageway for reducing the cross sectional area of the patterned dough from an inlet end (34) to outlet end (36) of at least 50:1 at an average convergence angle of ≦45° and an extruder exit port at the discharge end of the reducing passageway. The methods comprise the steps of: providing a plastic extrudable food mass; providing at least one color; mixing the food mass and color to form an organized complexly patterned food dough having an initial cross sectional area; reducing the initial cross sectional area by a factor of at least 50:1 with an average convergence angle of ≦45° while maintaining the cross sectional pattern to form a reduced cross sectional patterned dough, and extruding the reduced cross sectional dough through a die port having an opening of equal to the reduced cross sectional area to form a complexly patterned extrudate.

20 Claims, 4 Drawing Sheets

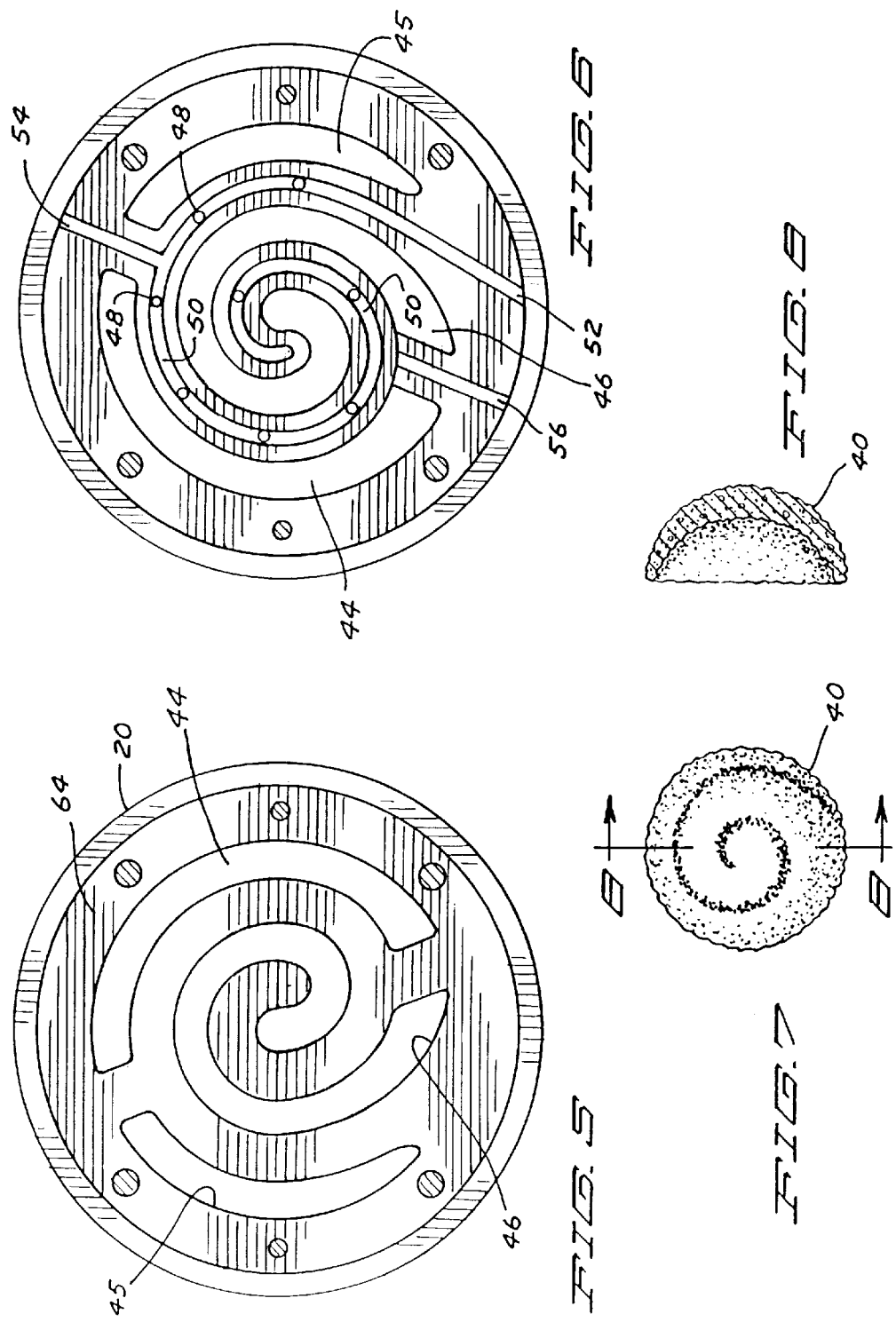

METHOD FOR MAKING A COMPLEXLY PATTERNED EXTRUDATE

CROSS REFERENCE

The present application is a division of U.S. application Ser. No. 09/072,868 filed May 5, 1998 which is a division of U.S. application Ser. No. 08/241,321, filed May 11, 1994, now U.S. Pat. No. 5,639,485 issued Jun. 17, 1997.

FIELD OF THE INVENTION

The present invention comprises apparatus and methods for making complexly patterned multicolored extruded food products. More particularly, the present invention relates to apparatus and methods for reducing a large cross sectional area complexly patterned food extrudate to a smaller area while maintaining the complex pattern.

BACKGROUND

Food products such as Ready-To-Eat ("R-T-E") cereals and snack products vary widely in composition, shape, color, flavor, texture, etc. Such products can include both puffed and unpuffed varieties. One attractive feature is their appearance which can include specific attributes such as shape and coloration. Especially attractive are products having a complex but organized pattern of coloration, shape and/or complex shape.

A wide variety of techniques are known to provide complexly shaped products such as rings, stars, letters, figures, etc. Problems generally include how to provide consistently the desired degree of shape detail or resolution in the finished pieces. Similarly, for colored products, a problem is how to consistently provide a fine level of detail. This problem of imparting a fine level of detail is particularly difficult in the provision of complexly patterned R-T-E cereals due to their generally smaller size. The problem is even more severe for puffed R-T-E cereal products due to the very tiny size of the pellets that are expanded to form the finished products. Of course, the pellets must contain and retain the complex pattern.

In particular, it would be desirable to prepare puffed R-T-E cereals having a shape and color pattern reminiscent of various sports balls such as baseballs, footballs, basketballs and soccer balls, such as are disclosed in 1) U.S. Design patent application Ser. No. 014,233, filed Oct. 18, 1993 by Laughlin et al. entitled Food Product Piece, now U.S. Pat. No. Des 373,671 issued Sep. 17, 1996, 2) U.S. Design patent application Ser. No, 014,068, filed Oct. 12, 1993 by Laughlin entitled Food Product Piece, now U.S. Pat. No. Des 384,785 issued Oct. 14, 1997 3) U.S. Dsign patent application Ser. No. 014,474, filed October 22, 1993 by Laughlin entitled Food Product Piece, now U.S. Pat. No. Des 368,791 issued Apr. 16, 1996 and 4) U.S. Design patent application Ser. No. 014,069, filed Oct. 12, 1993 by Laughlin entitled Food Product Piece, now U.S. Pat. No. Des 372,352 issued Aug. 6, 1996 respectively, each of which are incorporated herein by reference. Such products are characterized in part by high degrees of resolution such as by line features (such as to indicate traditional sticking patterns) 1 mm> in thickness and even 0.5 mm>. Providing a cereal pellet which upon puffing provides a puffed R-T-E cereal exhibiting such a fineness of detail is a difficult problem to overcome.

Line colored or externally striped food products such as R-T-E cereals as well as apparatus and methods for their preparation are described in U.S. Pat. No. 2,858,217 entitled Cereal Product With Striped Effect and Method of Making Same (issued Oct. 28, 1958 to J. O. Benson) and which is incorporated herein by reference. The '217 patent describes an extrudate extruder having a color injecting die insert for making a complexly patterned extrudate. However, the extrudate is directly extruded without any reduction in its cross sectional area. Also, the method appears to be limited to producing only flakes in a simple pattern of generally parallel more or less straight lines. The method is not capable of generating a direct expanded cereal or snack (i.e., expanded directly from the extruder) having a line detail of such a degree of fineness.

An improvement or modification in the technique for providing a line colored cereal based snack piece is described in U.S. Pat. No. 3,447,931 (issued Jun. 3, 1969 also to Benson et al.) entitled Process For Preparing A Puffed, Concave Shaped Cereal Product. More particularly, the '931 patent describes a process for making a cup flower shaped R-T-E cereal piece having a complex line pattern. The process involves extruding a plurality of rope dough filaments which are pressed together to form a column or rope without a material decrease in the cross section which is then combined under conditions such that no puffing occurs. The composite strand of compressed filaments is then cut into wafers and which are subsequently heat puffed. While useful, the process appears to be limited to producing only the "flower bloom" shape. Also, the pieces prepared are of a larger snack piece size rather than the relatively smaller pieces characteristic of R-T-E cereals.

The present invention provides an improvement in apparatus and methods for preparing food products characterized by at least two colors in an organized pattern. In particular, the present invention provides an improvement in the degree of fineness level of color detail (1 mm>) even on food products such as pellets for puffed R-T-E cereals that are very small (e.g., 3 to 6 mm) in diameter.

BRIEF DESCRIPTION OF THE DRAWING

FIG. 5 is an enlarged sectional view of the die insert taken along lines 5—5 of FIG. 4 in an upstream orientation.

FIG. 6 is an enlarged sectional view of the die insert taken along lines 5—5 of FIG. 4 similar to FIG. 5 but showing a downstream orientation.

FIG. 7 is an enlarged plan view of a finished puffed complexly patterned R-T-E cereal piece prepared using the present methods and apparatus.

FIG. 8 is an enlarged sectional view of the R-T-E cereal piece taken along lines 8—8 of FIG. 8 showing the concave shape of the cereal piece.

Figure 1:
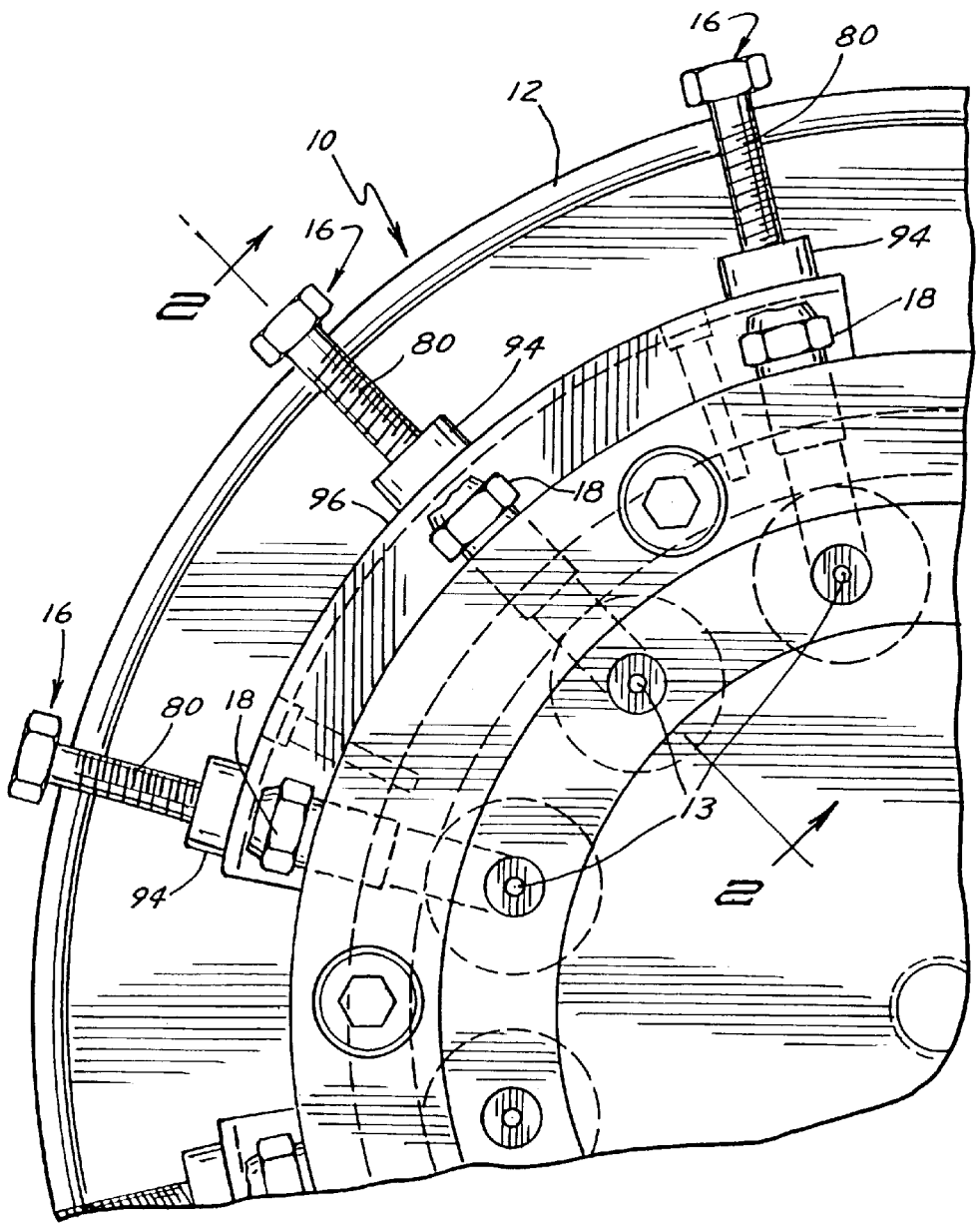
FIG. 1 is an end view partially cut away of the die face of a food cooker extruder showing a plurality of exit ports.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DESCRIPTION

Referring now to the drawing and briefly in particular to FIG. 1, there is shown an apparatus for preparing a complexly patterned cereal dough piece according to the preferred teachings of the present invention that is generally designated 10. In the most preferred form, apparatus 10 generally includes a means for providing at least one extrudable food product or cooked cereal dough such as a cooker extruder 12 as seen in FIG. 1. Extruder 12 is seen to have at least one, and more preferably a plurality of, exit ports or orifices 13 each for extruding of a complexly patterned cooked cereal dough of the resent invention (not shown) or other extrudable food product.

While a cooker extruder is the preferred equipment to provide the extrudable food, other conventional equipment and techniques can also be employed. For example, a batch cooker or semi-continuous cooker for cooking the ingredients in bulk can be equipped with dough forming and conveying extruder element. In other embodiments, e.g., a low moisture fruit paste, a-simple screw conveyor can be employed. While in the present description particular reference is made to the provision of complexly patterned farinaceous materials such as R-T-E cereals and snack products, the skilled artisan will appreciate that the apparatus and techniques can be employed with a wide variety of extrudable food products, especially such plastic foods as low moisture fruit products.

Figure 2:
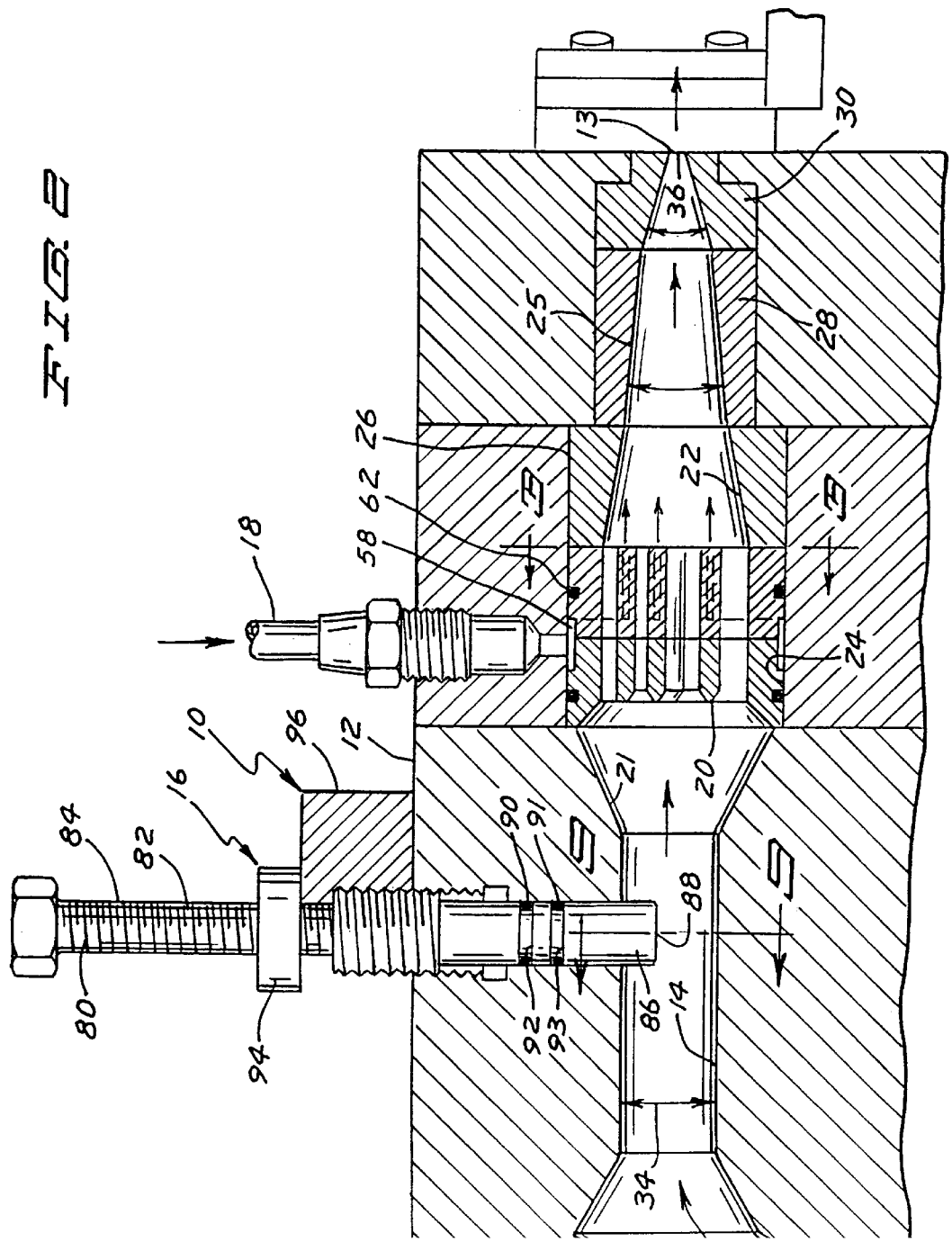
FIG. 2 is a sectional view greatly cut away of a reduction passageway of the present invention taken along lines 2—2 of FIG. 1.

Now referring to FIG. 2, the cooker extruder 12 provides the cooked cereal dough in quantity which can supply one or preferably, especially in commercial applications, a plurality of passageways 14, each leading to an exit port 13. In highly preferred embodiments, the apparatus 10 can additionally include a means for adjusting the cooked cereal dough flow rate and pressure such as the adjustably retractable dough flow adjuster plug 16 depicted. Such a flow rate adjustment means is particularly useful when, as in the embodiment depicted, the extruder supplies a large number of extrudate orifices. Absent such a flow rate adjustment means, the particular extrudate characteristics (e.g., pressure, mass flow) from each of so many orifices are difficult to control since the length of passageway 14 from the central supply can vary.

The flow adjuster plug 16 can include a rod or bolt 80 having threads 82 at its outer end 84 and a smooth portion 86 at its inner end 88. The plug further includes a means for sealing against dough leaking from the extruder such as at least a first "O" ring 90, 91 inset into a receiving peripheral seal groove 92, 93 respectively. The plug 16 can further include lock nut 94 which can be tightened against block 96 to secure the plug against movement such as caused by the extruder's vibration. The length of the plug and threading is adjusted so that when fully extended into passageway 14, the plug 16 will not choke off dough flow so as to minimize dough buildup upstream of the plug 16. Dough buildup can lead to dough hardening and plugging downstream.

Other dough flow adjustment devices can be used with or in substitution for the preferred flow adjuster plug 16 herein if 1) positioned upstream of the die insert 20, and 2) do not increase the likelihood of downstream plugging.

The apparatus 10 further essentially includes at least one food color supply 18 which can supply a flowable colored food material such as food color liquid (whether oil or preferably water based). The color supply 18 is in fluid communication with and the apparatus 10 further includes a means for mixing or forming the food color liquid and extrudable food product into a complexly patterned food extrudate such as a greatly enlarged (relative to the exit orifice) pattern forming die insert 20 depicted. In the preferred embodiment, the passageway 14 can include a first flared or divergent portion 21 immediately upstream of the die insert 20 to widen the passageway 14 to an equal diameter to the die insert 20 as well as a second convergent flared portion 22 downstream. In the drawing, the passageway 14 and other constituent elements are depicted in close to actual size. Thus, the diameter of the die insert depicted 20 is about 30 mm and is positioned within a slightly enlarged portion 24 of passageway 14. As a result, the diameter of the complexly patterned dough extrudate as it exits the die insert 20 will have an enlarged initial diameter about 30 mm. Of course, other sizes for the die insert 20 can be used (e.g., 15 to 100 mm).

In FIG. 2, it can be seen that the complexly patterned dough extrudate so formed then moves through by pressure flow and apparatus 10 further includes a means for reducing the cross sectional area of the complexly patterned food extrudate 25 while maintaining the pattern such as a reducing or necking passageway 25 depicted. The reducing passageway 25 can be fabricated from a single piece having, for example, a frusto conical bore or, as depicted, with a plurality of individual pieces such as the first, second and third pieces 26, 28 and 30, respectively, depicted. Individual pieces can be more easily cleaned. Also, the convergence angle and other attributes, e.g., internal surface, can be adjusted as needed (e.g., smoothness, anti-stick surface) to accommodate differences in the extrudate characteristics of different food products. In FIG. 2, it is seen that the passageway 14 has an initial relatively larger diameter 34 and a final relatively smaller or exit diameter 36 at the exit port 13. Moreover, while the passageway 14 is depicted as having a circular cross sectional area, in other embodiments the passageway 14 can be fabricated with a more complex pattern or peripheral configuration to define or define in part the exterior shape or configuration of the finished piece, including both regular shapes (e.g., stars, rings, ovoids, geometric shapes) as well as irregular shapes (e.g., animals, objects such as trees, cars, etc.). Furthermore, the passageway 14 can be fabricated with an interior surface of desired characteristics, e.g., polished or Teflon or other non-sticking surface, such as to provide decreased friction to facilitate retention of the complex pattern or to reduce the pattern's deformation. Especially desirable is an ovoid cross section for the passageway for preparation of an American style football or a rugby ball.

An important feature of the present invention is the convergence angle of the reducing passageway 25. It has been found important to maintain an average convergence or confinement angle of 5° to 45°, preferably 5° to 20°, and most preferably 10° to 15° in order to maintain the pattern while the cross sectional area is reduced. By "average convergence" is meant the angle formed from the diameter of the die insert 20 to the diameter 36 of exit port 13 over the length of the reducing passageway 25. As depicted, with passageway pieces 26, 28, and 30 some pieces, e.g., 26 and 30 have a sharper convergence angle while piece 28 has a shallower angle. Internal obstructions (e.g., shoulders) are to be avoided so as to provide a continuous passageway to minimize disrupting the complex pattern formed in the dough. FIG. 2 shows that the exit orifice diameter 36 is about 3 mm. Since the passageway 14 can have a complex cross sectional shape as described above, the extent of reduction of the pattern is more aptly characterized in terms of cross sectional area reduction rather than more simply a reduction in diameter. Thus the degree of reduction of cross sectional area in the illustrated embodiment is about 100:1. Of course, for other embodiments (e.g., for larger snack pieces), the extent of cross section reduction can be as little as 25:1. The exit orifice diameter 36 for a snack product can be correspondingly larger, e.g., 5 to 15 mm.

Surprisingly, such a shallow convergence angle allows for a reduction in cross sectional areas of at least 50:1 and even about 100:1 while maintaining a fine level of detail in the complex pattern. Thus, a complex shape can be imparted to a larger dough face or cross section and then reduced to the much smaller desired finish cross sectional area. This arrangement allows for the fabrication of a relatively large die insert to impart the complex pattern. Fabricating a small die insert to impart the desired degree of detail for the final exit diameter while possible on a development scale extruder is not commercially practical due in part to plugging or fouling of the die insert 20. The provision of a reducing passageway 25 having the requisite convergence angle allows for the provision of three dimensional shapes to be produced with a fine level of color detail. Moreover, the finished pieces are characterized by a color through the entire piece as compared to only topical coloration.

Also, it is seen that the mixing is not immediately proximate the discharge port 13 but distanced therefrom. This allows for the dough to modestly "set" so as to assist in maintaining the complex shape.

Figure 3:
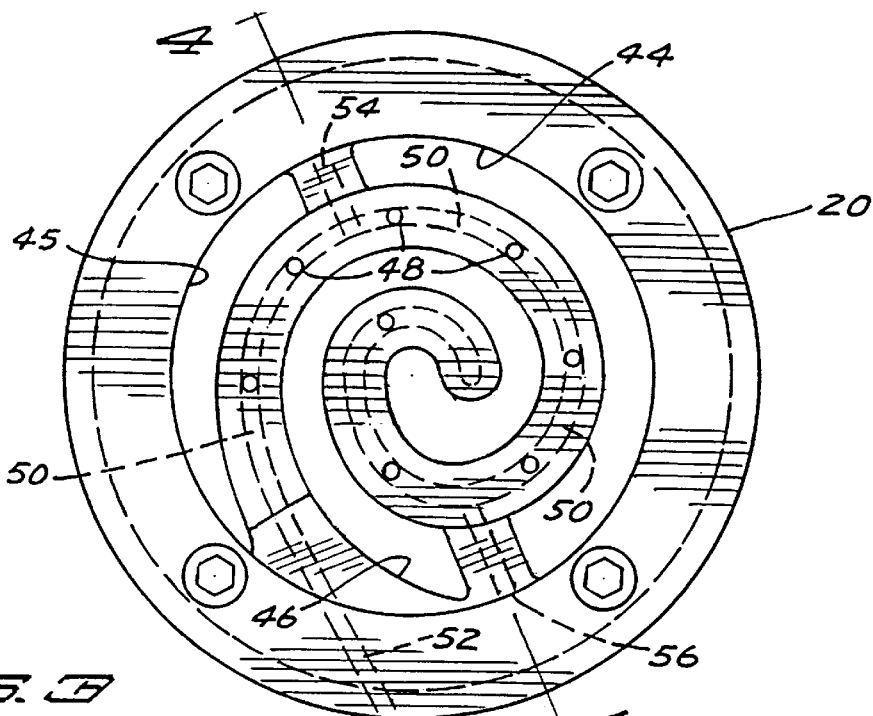
FIG. 3 shows an enlarged sectional view of a die insert for making an enlarged complexly shaped dough taken along lines 3—3 of FIG. 2.

Reference is now made to FIG. 3 which shows an enlarged cross section of the pattern forming die insert 20. As can be seen, this particular die insert can be used to fabricate a bicolored food piece 40 as seen in FIG. 7 having a swirl or spiral pattern. However, other pattern forming die inserts can be substituted therefor which, for example, can impart the line A pattern for products reminiscent of soccer balls, basketballs, baseballs and other sports objects.

The die insert 20 includes a means for imparting at least one, and more desirably a plurality of, dough interstitial gaps such as a plurality of dough dividing passageways such as passageways 44, 45, and 46 respectively formed by die dividing members. The die insert 20 can further include a means for injecting a food color or second colored dough into the interstitial dough gaps such as a plurality or array of evenly spaced food color injection ports 48 fed by a fluid supplying passageway 50 therethrough. The extrudable food product itself may be colored. The color supply 18 may supply a different color or the same color having a darker or lighter hue. Specifically, the food color passageways 50 are supplied with the food liquid from one or more food color supply ports such as ports 52, 54, and 56, respectively in the die dividing members. Of course, when the second or colored material is a food product such as a second dough or fruit paste, the passageways and injection ports can be enlarged to reduce friction and the potential for blockage.

Figure 4:
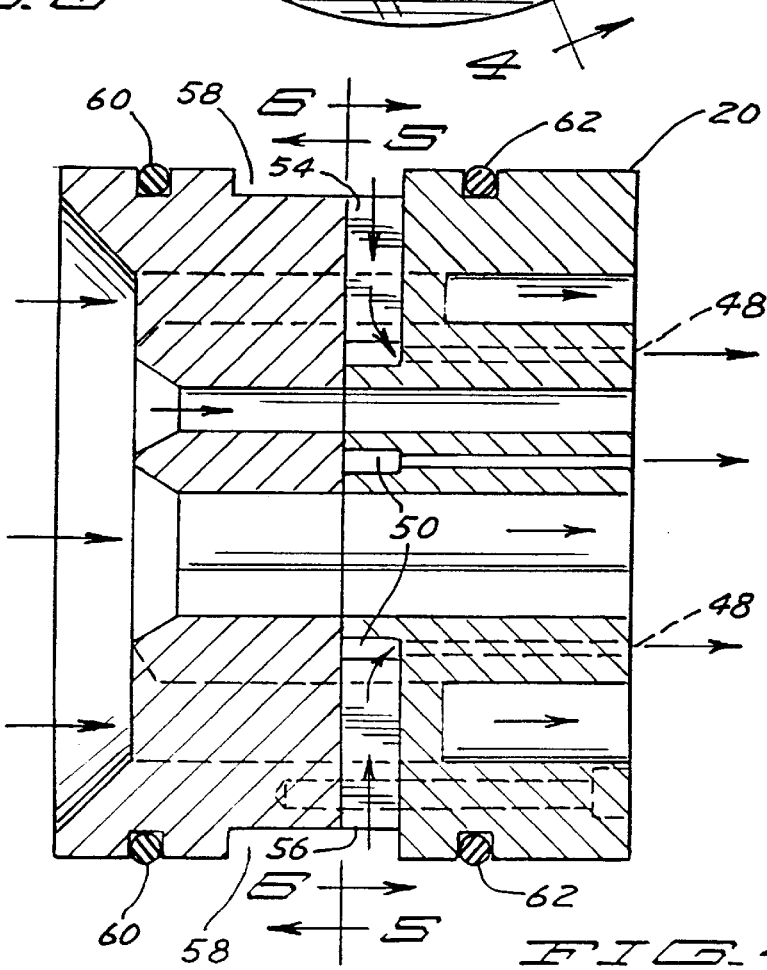
FIG. 4 is an enlarged sectional view of a die insert showing the channels for the food color flow taken along lines 4—4 of FIG. 3.

Referring now briefly to FIG. 4, it can be seen that the die insert 20 can further include a color fluid supply reservoir 58 supplied by the color supply 18 and which is in fluid communication with or supplies food color supply ports 52, 54, and 56. The die insert 20 can further include a means for sealing the color fluid supply reservoir 58 against premature admixture with dough such as "O" rings 60 and 62 depicted.

Reference is now briefly made to FIG. 5 which shows the upstream face 64 of the die insert 22. FIG. 5 shows that the upstream face 64 for this particular die insert contains no color supply discharge ports and that the discharge of color is preferably in a downstream direction.

Reference is now made briefly to FIG. 6 wherein the relationship between the supply inlet ports 52, 54, 56, supply passageways 50 and color discharge ports 48 can be most simply seen.

Reference now is next briefly made to FIGS. 7 and 8 which show that the food piece 40 can have a cupped shape and that the coloration can extend throughout the body of the piece. The piece 40 depicted is a puffed R-T-E cereal piece prepared by direct expansion from the extruder having a finished diameter of about 70 mm.

In the present invention, the complexly patterned dough of reduced cross sectional diameter is extruded through the reduced diameter exit orifice 36 (e.g., about 3 mm). Thereafter, the extrudate is face cut in a conventional manner to form individual pieces such as with one or more rotating knives. Depending upon the conditions of the extrudate, an unpuffed pellet piece can be formed-for subsequent puffing, or, alternatively, and preferably herein, a directly expanded finished puffed piece is formed. The finished food piece whether subsequently puffed or puffed by direct expansion upon exiting the exit orifice 13 is essentially characterized by exhibiting a high resolution or fine degree of color detail. The detail can include surface line coloration of as thin as about 0.5 mm in the puffed product. In certain embodiments, the interior is also bicolored or multicolored as well as having topical or surface coloration.

The extrudable food can comprise a wide variety of conventional food types and in particular can include a fruit paste, potato dough (e.g., for a fabricated chip) or a cooked cereal dough. The cooked cereal dough can be for either R-T-E cereals (whether puffed or unpuffed), snack products, baked goods, or pastas. Especially desirable are cooked cereal doughs for puffed R-T-E cereals. Puffed food products such as snacks can be prepared by hot air puffing, deep fat frying, gun puffing or microwave (especially high intensity, e.g., >100 V/cm field strength). Product puffed without deep fat frying can have oil added to the composition or have a topical oil application. R-T-E cereals can have a sugar coating. Puffed food pieces of the product base (i.e., prior to or without oil or sugar) can have a density of about 0.1 to 0.5 g/cc. The colored portion forms a line or a plane through the body of the food piece. "Highly complex" food products are characterized as having a plurality of colored features at least two of which (e.g., two planes or a line and a plane) intersect within the body of the food piece.

While in the present invention, the particular die insert 20 depicted is designed to admix a liquid food color into a cooked cereal dough so as to provide line coloration of extremely fine detail, the die insert 20 can be modified (e.g., such as by enlargement of ports 52, 54, 56 fluid passageways 50 and discharge ports 48) to admix two or more cooked doughs or other flowable colored food materials, especially liquefied fats (e.g., chocolate, cheese), or fruit paste.

Also, while the particular die insert 20 depicted is designed to provide the swirled finished product depicted, other die inserts can be interchanged to provide the line coloration detail to provide the particular desired end products such as the various sports balls (e.g., soccer, baseball, basketball, American football) referenced above.

It will be appreciated that for those embodiments that are extruded without direct expansion or puffing upon extrusion that lines having a detail of about 0.1 mm in width can be obtained. Upon subsequent expansion (e.g., deep fat frying, gun puffing, fluidized bed puffing, radiant heat puffing or other puffing methods), puffed pieces will of course expand causing an increase in the width of the line. These enlarged lines (i.e., 0.5 mm>), however, are nonetheless thinner than lines obtainable by any other known method. If desired, thicker lines (e.g., about 3 mm) can also be formed.

What is claimed is:

1. A method for preparing a food product having at least two exposed colors with improved detail resolution comprising:
   directing a first food mass through a passageway;
   adding a second food mass, contrasting in color to the first food mass, into the passageway;
   integrating the first and second food masses to impart a complex pattern of the second food mass to the first food mass, thereby creating a third food mass having an initial cross-sectional area defined by the passageway; and
   directing the third food mass through an acutely converging portion of the passageway to reduce the initial cross-sectional area of the third food mass by at least 4:1 while maintaining the complex pattern of the third food mass.

2. The method of claim 1 wherein the step of directing the first food mass includes the step of adjusting the rate and pressure of the flow of the first food mass in a circular passageway by adjustably retractably extending a plug into the circular passageway, with the plug having circular cross sections, terminating the extension of the plug into the circular passageway by a stop means exterior to the circular passageway, with the length of the plug extending into the circular passageway when stopped by the stop means being less than 90% of the width of the circular passageway, and sealing the plug against food leakage.

3. The method of claim 1 wherein the second food mass in the complexly patterned third food mass of the reduced cross sectional area has a detail of about 0.1 mm in width.

4. The method of claim 1 wherein the step of directing the first food mass comprises the step of flowing the first food mass through an extrudate passageway; and wherein the mixing step comprises the steps of imparting at least one interstitial gap in the flow of the first food mass in the extrudate passageway, and injecting the second food mass into the interstitial gap in the flow of the first food mass.

5. The method of claim 1 wherein the ratio of the initial cross sectional area to the reduced cross sectional area of the third food mass is at least 50:1.

6. The method of claim 1 wherein the converging portion has a convergence angle that ranges from 5° to 20°.

7. The method of claim 1 wherein the reducing passageway includes at least a first piece having a downstream cross section equal to the upstream cross section of a second piece so as to form a continuously smooth passageway.

8. The method of claim 7 comprises the step of imparting at least one interstitial gap in a spiral pattern by die dividing members located in the flow of the first food mass.

9. The method of claim 7 wherein the passageway has a diameter of about 30 mm and a diameter of an extrudate exit port is about 3 mm.

10. The method according to claim 1, further comprising:
    extruding the cross-sectionally reduced third food mass through a die port of the passageway; and
    cutting the extruded third food mass to firm individual food pieces having face portions depicting the complex pattern.

11. The method according to claim 10, further comprising:
    expanded the individual food pieces to enlarge associated cross-sectional areas thereof to form a snack food product exhibiting the complex pattern in an enlarged state with high detail resolution.

12. The method of claim 10, further comprising: puffing the food pieces to have a spherical shape.

13. The method of claim 10
    wherein the initial cross section of the first food mass is about 1200 to 3000 mm$^2$ and wherein the reduced cross sectional area is about 10 to 300 mm$^2$.

14. The method of claim 13
    wherein the food and color are mixed in a passageway of a cooker extruder with a die dividing insert therein and wherein the reducing passageway is continuous.

15. The method of claim 14
    wherein the first food mass comprises a cooked cereal dough.

16. The method of claim 15
    wherein the cross sectional area is reduced in a converging frusto conically shaped passageway.

17. The method of claim 16
    wherein the extrudate is directly expanded upon and cut to form individual pieces of puffed cereal dough.

18. The method of claim 16
    wherein the extrudate is extruded to form an unexpanded complexly patterned dough of reduced cross sectional area, and
    wherein the method additionally comprises the steps of
    F. sectioning the extruded complexly patterned dough to form individual half product or pellet pieces having a complex pattern, and
    G. puffing the pieces to form puffed food pieces.

19. The method of claim 18
    wherein the puffed food pieces have a spherical shape.

20. A method for preparing a food product having at least two colors exhibiting improved detail resolution; comprising the steps of:
    A. providing a first plastic extrudable food mass having a first color;
    B. providing at least a second flowable food material having a second color differing from the first color in color or hue;
    C. mixing the food mass and the second food material to form a complexly patterned food mass having an initial cross sectional area;
    D. reducing the cross sectional area of the complexly patterned food mass by a factor of at least 4:1 through a reducing passageway with an average convergence angle of 5° to 45° while maintaining the cross sectional pattern to form a reduced cross sectional patterned extrudate; and
    E. extruding the reduced cross sectional extrudate through a die port.

* * * * *